United States Patent Office 2,895,958
Patented July 21, 1959

2,895,958

DIOXO-THIADIAZOLIDINES AND PROCESS THEREFOR

William S. Friedlander, Hudson, Wis., assignor to Minnesota Mining and Manufacturing Company, St. Paul, Minn., a corporation of Delaware No Drawing. Application December 16, 1957
Serial No. 702,821

6 Claims. (Cl. 260—301)

The present invention relates to heterocyclic compounds and more particularly to certain dioxo-1,2,3-thiadiazolidines and a process for their preparation.

It is the principal object of the present invention to prepare novel and useful heterocyclic organic compounds which may be represented by the following formula:

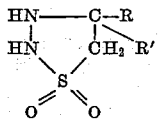

wherein R is hydrogen or a lower alkyl radical and R' is hydrogen or an alkyl radical containing not more than about 16 carbon atoms. It is another object of the invention to provide a convenient and efficient process for the preparation of these compounds. Other objects of the invention will become apparent to those skilled in the art upon reading the specification which follows.

In accordance with the above and other objects of the invention it has been found that 1,1-dioxo-1,2,3-thiadiazolidines can be prepared by the reaction of hydrazine with an appropriately substituted β-chloro-alkane sulfonyl fluoride. The process of the invention may be represented by the following equation:

$H_2N-NH_2 + RR'CClCH_2SO_2F \longrightarrow$

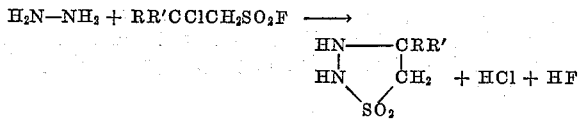

wherein R and R' have the same significance as previously defined.

In carrying out the process, it is ordinarily preferred to add the beta-chloroalkanesulfonyl fluoride to an excess of hydrazine; if desired, the latter can be dissolved in an inert organic solvent. To facilitate the reaction, the hydrazine may be stirred and the beta-chloro-alkanesulfonyl fluoride added thereto over a convenient period of time.

Broadly speaking, the process may be carried out over a wide range of temperatures and in the presence of a mutual, inert solvent for the reactants. Examples of suitable solvents are chlorinated hydrocarbons, such as carbon tetrachloride, dichlorobenzene and 1,2,4-trichlorobenzene; hydrocarbons, such as benzene, toluene, hexane, tetralin, and xylene; ethers such as diethyl ether; diisopropyl ether; and the like.

The reaction of hydrazine and the sulfonyl fluoride is exothermic and is ordinarily carried out at moderate, controlled temperatures, i.e. in the range of from about —5° C. to 100° C. Temperature control is conveniently effected in the usual manner, as by cooling, the use of low-boiling solvents and/or adjustment of the rate of addition of the reactants. Preferably the process is carried out at a temperature ranging between 0° C. and about 50° C. Lower temperatures than —5° C. can be employed, but may not be economically practical owing to the necessity for providing cooling means of higher capacity. While temperatures of 50° C. to 100° C. and even higher can be used, the reaction is then more difficult to cotnrol and undesirable by-products may be formed. The temperature selected for use in the process tends to affect the length of time required for completion of the reactions, according to the inverse relationship between temperature and duration of reaction commonly encountered in processes of this type.

Because of the formation of HF in the process, it is obvious that glass or glass-lined vessels are not practical for use in large-scale production. However, as is well known, suitably corrosion-resistant or lined kettles and tanks, for example steel vessels lined with polytetrafluoroethylene or the like, can be employed.

The 1,1-dioxo-1,2,3-thiadiazolidines of the invention have particular utility as blowing agents for epoxy resin systems, ordinarily at a level of from about 5 percent to about 15 percent by weight. The rigid but light structures which result when these blown resins are cured in place in the airframes of high performance aircraft, for example, add greatly to the strength of the airframe without adding unduly to the weight. Additionally they furnish thermal insulation which is important particularly to protect the pilot from extremes of temperature to which the external surfaces of the aircraft are subjected.

Illustrative examples of the beta-chloro-alkanesulfonyl fluorides useful as starting materials for preparation of the compounds of the present invention are: beta-chloropropanesulfonyl fluoride; beta-chloro-butanesulfonyl fluoride; beta-chlorohexanesulfonyl fluoride; beta-chloro-octanesulfonyl fluoride; beta-chloro-dodecanesulfonyl fluoride; beta-chloro-tetradecanesulfonyl fluoride; beta - chloro - octadecanesulfonyl fluoride; beta - chloro, beta-methyl-propanesulfonyl fluoride (i.e. beta-chloro-isobutanesulfonyl fluoride); beta-methyl-beta-chlorobutanesulfonyl fluoride; beta-methyl-beta-chloropentanesulfonyl fluoride; and beta-ethyl-beta-chlorobutanesulfonyl fluoride.

The beta-chloro-alkanesulfonyl fluoride intermediates may be conveniently prepared by adding sulfuryl chlorofluoride to an olefinically unsaturated compound under free radical conditions. The reaction may be represented by the following equation:

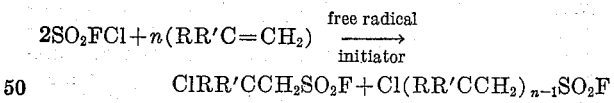

wherein R and R' have the same significance as previously defined and n is an integer greater than one.

While the product of the reaction is a mixture of 1:1 and higher adducts, the former (which are the beta-chloro-alkanesulfonyl fluoride starting materials of the present invention) are usually present in reasonably large amounts and their formation may further be favored by increasing the relative molar ratio of the sulfuryl chloro-fluoride to olefinic compound.

For the preparation of the beta-chloro-alkanesulfonyl fluorides it is only necessary that the reactants be mixed together at reaction temperature in the range of —100 to 250° C. in the presence of a free-radical initiator, such as ultraviolet light, an organic peroxide or the like. The resulting addition product of the reaction is then easily separated into adduct fractions by distillation, the lower-boiling of which is the desired 1:1 adduct. This procedure is more specifically illustrated by the following detailed descriptions of the preparation of several of the intermediate compounds useful in the process of the invention.

EXAMPLE A

A mixture of 92.0 g. of cold liquid SO₂FCl, 31.5 g. of cold liquid isobutylene (1.4:1 mol ratio), and 3.0 g. of benzoyl peroxide is charged into an autoclave cooled with solid carbon dioxide, with care to avoid moisture contamination. The autoclave is sealed and heated to 85° C. for 14 hours, cooled to room temperature and vented into a trap system. There is obtained 84.3 g. of a liquid product, which upon fractional distillation yields the following:

(1)

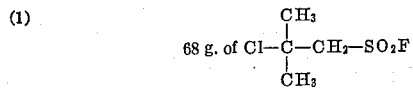

B.P. 103° C. at 80 mm. Hg; $n_D^{25.5}$ 1.4256

Calculated for C₄H₈SO₂FCl: percent Cl, 20.3; percent F, 10.8. Found: percent Cl, 19.7; percent F, 12.3.

(2)

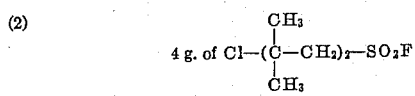

B.P. 137° C. at 20 mm. Hg; $n_D^{25.5}$ 1.4420

EXAMPLE B

A mixture of 26.0 g. of SO₂FCl, 19.7 g. of butene-1 (1:1.6 mol ratio), and 2.0 g. of benzoyl peroxide is reacted by the procedure described in the preceding example to give 44.2 g. of a liquid product. Upon fractional distillation the liquid product yields the following:

(1)

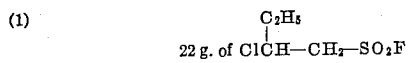

B.P. 118.5° C. at 80 mm. Hg; $n_D^{25} = 1.4281$

Calculated for C₄H₈SO₂ClF: percent Cl, 20.3; percent F, 10.8. Found: percent Cl, 20.0; percent F, 11.0.

(2)

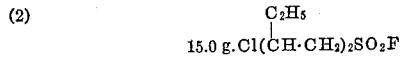

B.P. 143° C. at 20 mm. Hg; $n_D^{25} = 1.4487$

Calculated for C₈H₁₆SO₂FCl: percent Cl, 15.4; percent F, 8.25. Found: percent Cl, 14.7; percent F, 7.5.

EXAMPLE C

To 6.0 grams (.051 mol) of sulfuryl chlorofluoride are added 7.0 grams (.0585 mol) of octene-1 (1:1.1 mol ratio) and the mixture is cooled in solid carbon dioxide and sealed in a glass ampoule in vacuo. The sealed ampoule and its contents are exposed to ultraviolet radiation from a quartz-windowed mercury arc lamp for about 15 hours at room temperature (approximately 25° C.). On opening the ampoule, no evolution of gaseous material is noted. The reaction mixture is distilled and a fraction of 8.6 grams of the adduct, C₆H₁₃CHClCH₂SO₂F, is obtained as a clear, mobile liquid having the boiling point 158° C. at 40 mm. Hg; $n_D^{25} = 1.4384$. Analysis of the adduct shows it to contain 15.4 percent chlorine and 8.3 percent fluorine in agreement with the calculated values for this structure of 15.39 percent and 8.25 percent, respectively. The structure is supported by infrared analysis, showing strong —SO₂F bands at about 7.2μ and 8.2μ.

The following compounds, which are further illustrative of the beta-chloro-alkanesulfonyl fluorides, are similarly prepared and have the noted properties:

Beta-chloro-propanesulfonyl fluoride:
 Boiling point, 72° C. at 20 mm. Hg
 Refractive index, $(n)_D^{26} = 1.4220$
Beta-chloro-octadecanesulfonyl fluoride:
 Boiling point, 185–190° C. at 0.4 mm. Hg
 Melting point, 41–42.5° C.

In order to disclose the nature of the present invention more clearly, the following specific examples illustrating the process of the invention and the properties of the products thereof are set forth. It should be understood, however, that this is done solely by way of example and is intended neither to delineate the scope of the invention nor limit the ambit of the appended claims.

EXAMPLE 1

13.04 grams (0.057 mole) of beta-chloro-octanesulfonyl fluoride are added slowly to a round bottomed glass reaction flask containing 25 milliliters (0.625 mole) of 85 percent hydrazine hydrate. The resulting vigorous exothermic reaction causes the mixture to boil, and the reaction, which is controlled by a cold water bath which surrounds the reaction vessel, appears to be essentially complete after five minutes. The desired product, 1,1-dioxo-4-hexyl-1,2,3-thiadiazolidine, which may be represented by the formula:

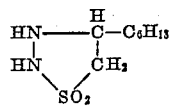

precipitates as a white solid from the reaction mixture. This crude product is recovered by filtration and is found to weigh 8.85 grams. It is purified by recrystallizing it first from butyl alcohol and then from benzene. The melting point of the purified product is found to be from 122.5 to 123.5° C. (at which point it decomposes). When subjected to analysis the product is found to contain 13.9 percent nitrogen, 46.9 percent carbon and 8.7 percent hydrogen as compared to calculated values of 13.6 percent, 46.6 percent and 8.7 percent, respectively. The infrared spectrum of this material is consistent with the structure shown.

EXAMPLE 2

34.8 grams (0.2 mole) of beta-chloro-butanesulfonyl fluoride are added slowly and with vigorous stirring to a round-bottomed flask containing 20.5 grams (0.6 mole) of 95 percent hydrazine. A vigorous reaction ensues and the mixture is heated to refluxing by the heat of reaction. The reaction appears to be complete within 5 minutes. A precipitate of the desired product, 1,1-dioxo-4-ethyl-1,2,3-thiadiazolidine, which may be represented by the formula:

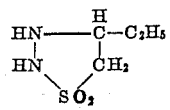

forms in the reaction mixture. This precipitate is recovered by filtration and is found to weigh 13.5 grams (45 percent of the theoretical yield). The crude product is recrystallized from benzene and thereafter melts at about 138 to 140° C. with decomposition. When subjected to analysis this product is found to contain 31.9 percent carbon, 6.6 percent hydrogen, 18.6 percent nitrogen, and 21.4 percent sulfur as compared to calculated values of 32 percent, 6.7 percent, 18.7 percent and 21.3 percent, respectively. The infrared spectrum is consistent with the structure shown.

EXAMPLE 3

34.8 grams (0.2 mole) of beta-chloro-isobutanesulfonyl fluoride are added slowly to a flask containing a mixture of 20.5 grams (0.6 mole) of 95 percent hydrazine in 200 milliliters of diethyl ether. A vigorous reaction occurs and the mixture is heated to refluxing by the reaction exotherm. The reaction appears to be essentially complete within about 5 minutes after the addition of the sulfonyl fluoride. A precipitate of the desired product, 1,1-dioxo-4,4-dimethyl-1,2,3-thiadiazolidine, which can be represented by the formula:

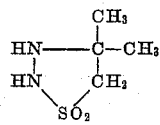

and is collected by filtration. This crude product, which weighs 1.7 grams (5.7 percent of theoretical), is purified by recrystallization from benzene. The product thus purified melts at 179–190° C. with decomposition. When subjected to analysis it is found to contain 31.3 percent carbon, 6.6 percent hydrogen, 20.5 percent sulfur and 19.7 percent nitrogen as compared to calculated values of 32.0, 6.6, 21.3, 18.7, respectively.

EXAMPLE 4

The 1,1-dioxo-1,2,3-thiadiazolidines of the invention are useful blowing agents for resins and their use to blow standard epoxy resin formulations is illustrated in Table I below. In each lot 50 parts of an epoxy resin comprised primarily of the diglycidyl ether of bis-phenol A (which is available commercially under the trade mark Bakelite 2774, a product of the Bakelite Division of the Union Carbide and Carbon Corporation) and 7 parts of meta-phenylene diamine catalyst are mixed with the blowing agent over a steam bath and the mixture is cooled immediately to room temperature and allowed to stand for 16 hours. The mixture is then cured and blown by heating to a temperature somewhat above the melting point of the dioxo-1,2,3-thiadiazolidine employed; in this case, to about 130°–140° C. for one hour. (All parts are by weight.)

Table I

| Lot | Blowing agent | | Change of volume (percent) |
| --- | --- | --- | --- |
| | Parts | Compound | |
| 1 | 5.4 | 1,1-dioxo-4-hexyl-1,2,3-thiadiazolidine | 300 |
| 2 | 4.5 | 1,1-dioxo-4-ethyl-1,2,3-thiadiazolidine | 800–900 |

The resulting cured resin foams are extremely rigid and strong and are useful to fill void spaces in metal structures (such as the airframes of high performance aircraft) and to provide additional rigidity and thermal insulation in such structures.

The terms and expressions which have been employed are used as terms of description and not of limitation, and it is not intended, in the use of such terms and expressions, to exclude any equivalents of the feature shown and described or portion thereof but it is recognized that various modifications are possible within the scope of the invention claimed.

What is claimed is:
1. A 1,1-dioxo-1,2,3-thiadiazolidine represented by the formula:

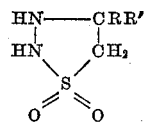

wherein R is a member of the group consisting of hydrogen and lower alkyl radicals and R' is a member of the group consisting of hydrogen and alkyl radicals containing not more than 16 carbon atoms.

2. 1,1-dioxo-4-hexyl-1,2,3-thiadiazolidine.
3. 1,1-dioxo-4-ethyl-1,2,3-thiadiazolidine.
4. 1,1-doxo-4,4-dimethyl-1,2,3-thiadiazolidine.
5. The process for the preparation of 1,1-dioxo-1,2,3-thiadiazolidines which comprises condensing a beta-chloro-alkane-sulfonyl fluoride represented by the formula:

$$RR'CClCH_2SO_2F$$

wherein R is a member of the group consisting of hydrogen and lower alkyl radicals and R' is a member of the group consisting of hydrogen and alkyl radicals containing not more than 16 carbon atoms, with hydrazine and recovering a compound represented by the formula:

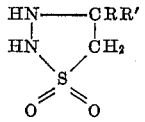

wherein R and R' have the significance as previously defined.

6. The process for the preparation of 1,1-dioxo-1,2,3-thiadiazolidines which comprises condensing a beta-chloro-alkane-sulfonyl fluoride represented by the formula:

$$RR'CClCH_2SO_2F$$

wherein R is a member of the group consisting of hydrogen and lower alkyl radicals and R' is a member of the group consisting of hydrogen and alkyl radicals containing not more than 16 carbon atoms, with hydrazine at a temperature in the range of about −5° C. to about 100° C., and recovering a compound represented by the formula:

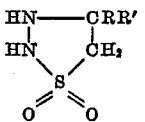

wherein R and R' have the significance as previously defined.

No references cited.